Patented Oct. 23, 1951

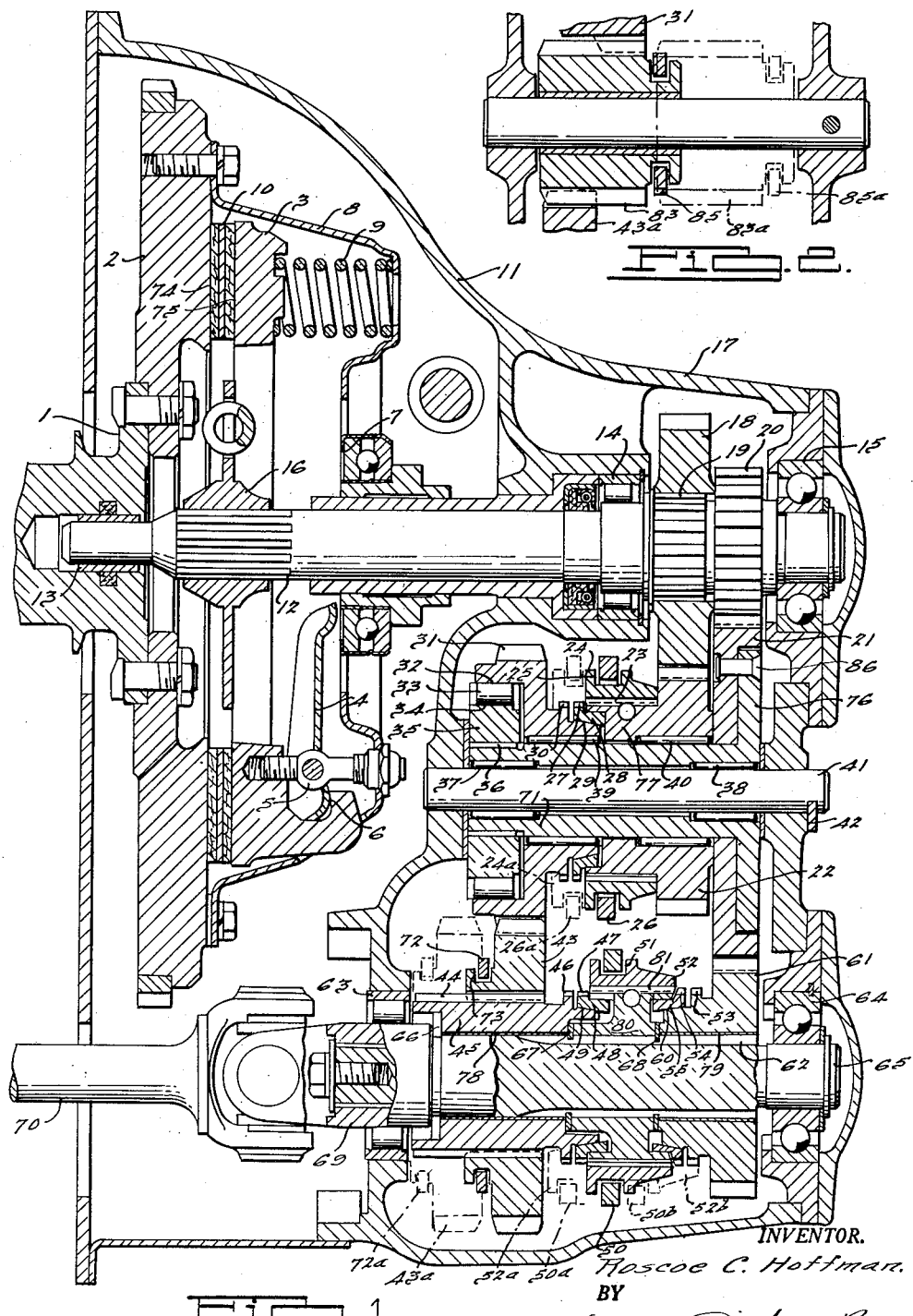

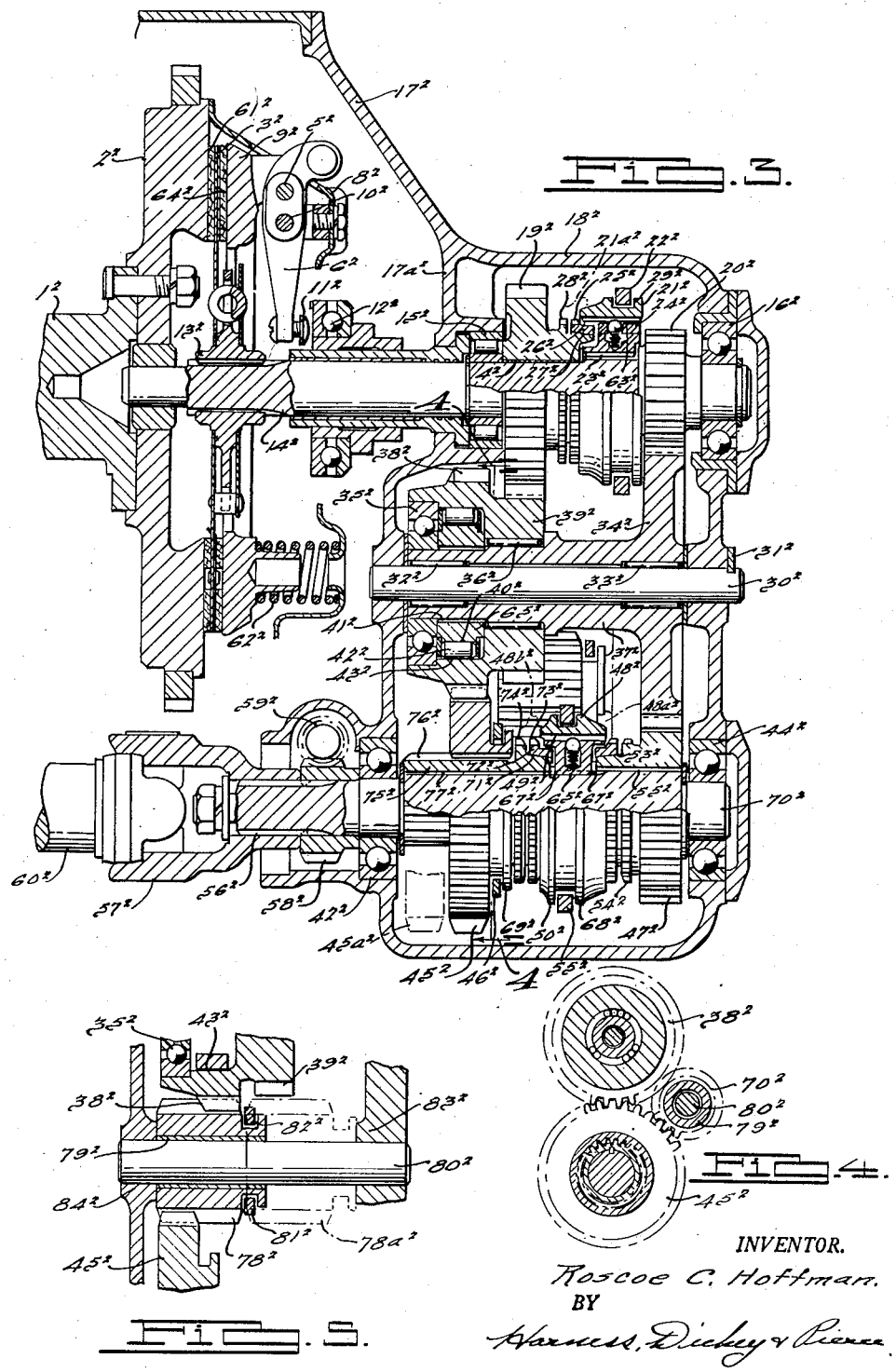

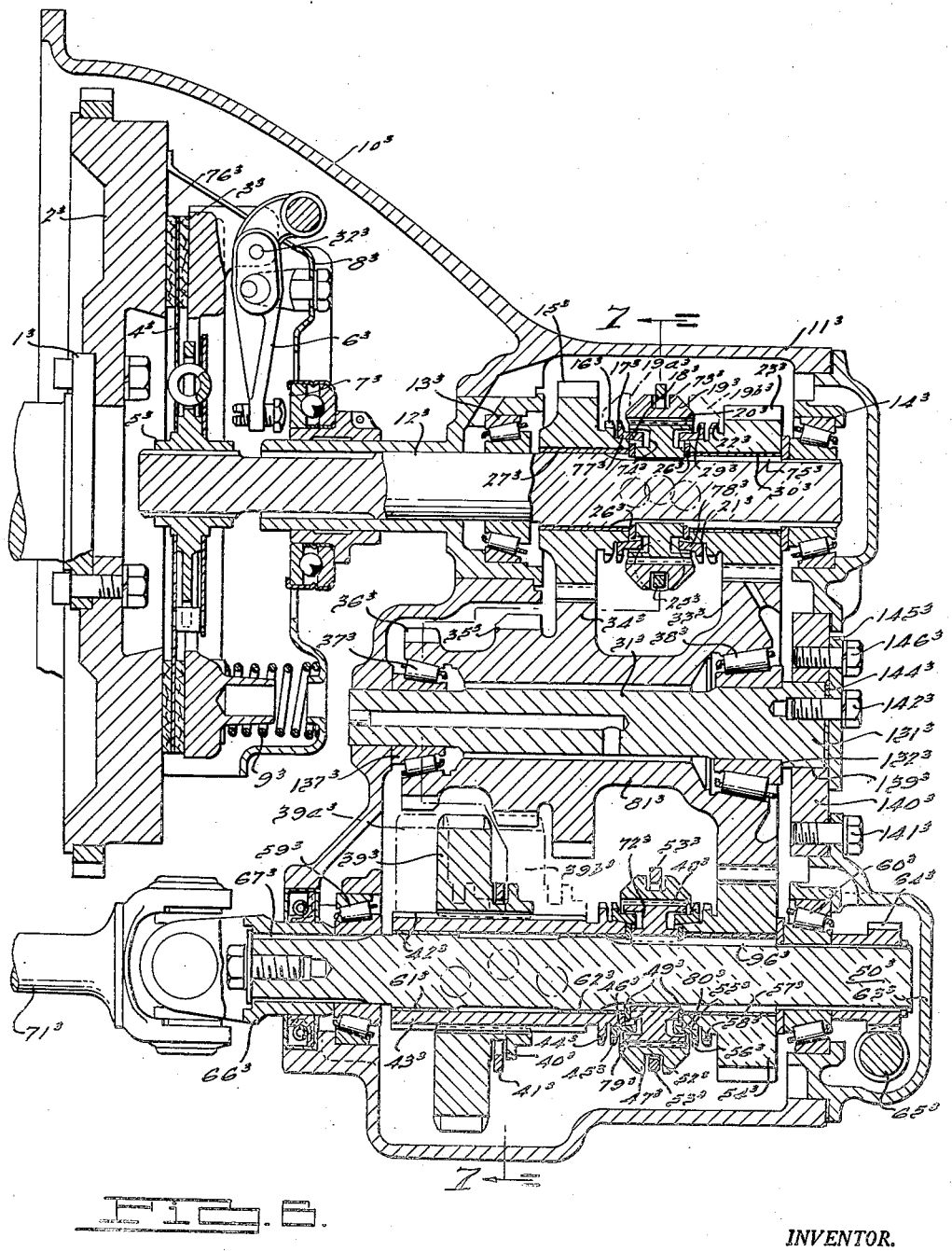

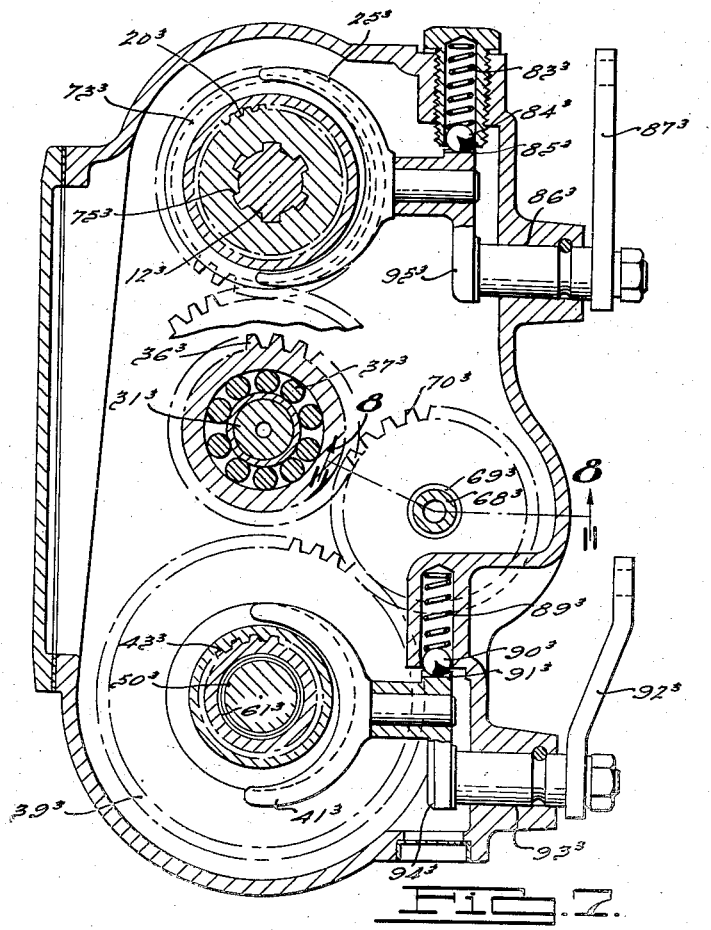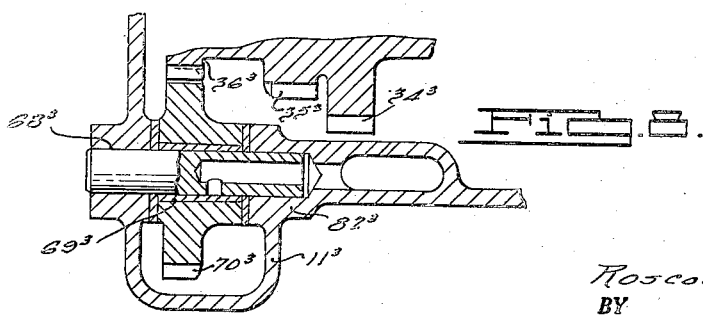

2,572,480

UNITED STATES PATENT OFFICE 2,572,480

TRANSMISSION

Roscoe C. Hoffman, Detroit, Mich.

Application June 17, 1947, Serial No. 755,212

21 Claims. (Cl. 74—359)

The present invention relates to change speed gear transmissions, particularly for automotive vehicles, and has as its principal object the provision of an improved and simplified transmission particularly adapted for installation in crowded quarters, as for example in vehicles wherein the engine is located transversely, as in rear engine, rear drive passenger automobiles.

Another object of the invention is to provide such a transmission which employs very few gears in proportion to the number of output speeds available and which is so housed in conjunction with the vehicle main clutch as to occupy a minimum of space.

Still another object is to provide an improved main clutch and transmission assembly incorporating three parallel shafts and two gear trains, one of said gear trains being employed for first speed, third speed and reverse drive, and the other of said gear trains for second speed drive.

Still another object is to provide a transmission of the indicated variety employing three parallel shafts, with ratio changing means including shiftable positive toothed clutch elements carried by two of said shafts and movable longitudinally therealong to change the effective gear ratio.

Other objects and advantages will be apparent upon consideration of the present disclosure in its entirety.

In the drawings:

Fig. 1 is a central, longitudinal, sectional view of a transmission incorporating the principles of the present invention;

Fig. 2 is a sectional detail of the reverse gear;

Fig. 3 is a view similar to Fig. 1 showing a somewhat modified construction;

Fig. 4 is a somewhat diagrammatic cross-sectional representation of the arrangement of the reverse idler and gears meshing therewith, taken substantially on the line 4—4 of Fig. 3 and looking in the direction of the arrows;

Fig. 5 is a longitudinal sectional detail of the reversing gear means incorporated in the embodiment of Fig. 3;

Fig. 6 is a sectional view similar to Fig. 1 showing another somewhat modified construction;

Fig. 7 is a cross section taken substantially on the line 7—7 of Fig. 6, looking in the direction of the arrows; and Fig. 8 is a sectional detail taken substantially on the line 8—8 of Fig. 7 and looking in the direction of the arrows.

THE MAIN CLUTCH

The transmission forming subject matter of this invention employs positive toothed slidable coupling means for controlling the action of the gears for the several speeds, and for that reason requires a clutch for disconnecting the power source during the coupling and uncoupling of the drives. For this purpose it operates in conjunction with a main clutch which may, as shown, be of generally conventional arrangement. The main clutch is assembled on a face 74 of a flywheel 2 bolted to a flange 1A formed on the crankshaft 1 of an engine which is not otherwise illustrated, since it forms no part of this invention. The clutch comprises a housing 8 in which a clutch pressure plate 3 is carried in such a manner that it is driven in the angular direction but is slidable axially. Upon this plate 3 bear, inside the housing 8, springs 9 urging the plate forcibly toward the flywheel 2. Between faces 74 and 75 of the flywheel 2 and the pressure plate 3, respectively, is included a driven plate 10, with friction lining thereon, which is normally held in compression between the pressure plate and flywheel.

The pressure plate 3 can be withdrawn from engagement with the driven plate 10 to release the clutch by a number of fingers 4 pivoting about studs 5 in the housing 8 and bearing on the plate 3 at point 6 for backing it away from the driven plate 10 when the fingers 4 are acted upon by a thrust bearing 7 through the instrumentality of outside release means (not shown) in the well-known manner.

The clutch-driven plate 10 is secured to a hub 16 which is in splined engagement with a shaft 12 which is the driving shaft of the transmission. At its front end shaft 12 is piloted as by bearing means 13 in the rear end of the crankshaft.

The flywheel 2 and the clutch mechanism above described are enclosed in a bell-shaped housing 11 which is integral with a gear case 17 in which all the shafts and gears of the transmission are assembled.

THE TRANSMISSION MECHANISM

Drive-shaft assembly

The drive shaft 12 is supported rotatably in the fore and aft walls of the gear case 17 in bearings 14 and 15, and between these bearings mount two gears 18 and 20 rigidly secured to it. Gear 20 is shown as integral with shaft 12, while gear 18 is splined to the shaft as indicated at 19.

Intermediate shaft assembly

Located in parallel spaced relationship to the drive shaft 12, and immovably secured in the end walls of the gear case 17 by a key 42, is an intermediate shaft 41 which serves as a journal for two roller bearings 37 and 38 disposed adjacent said end walls. On these bearings runs a sleeve 71 spanning the whole distance between the end walls of the gear case 17. The shown stationary arrangement of the shaft 41 greatly stiffens the assembly. The sleeve 71 serves a number of purposes, one of which is to support rotatably a gear 21 secured, as by rivets 86, to a flange 76 on the extreme end of the sleeve 71 and located over the bearing 38. The gear 21 is in constant mesh with the gear 20 on the shaft 12.

Rotatably mounted on the sleeve 71 between the gear 21 and the opposite wall of the gear case 17 as by means of roller bearing 39 and 40, respectively, are two other gears 31 and 22 spaced from one another and provided with means for releasably coupling them together for positive two-way drive, as well as means providing a one-way driving connection between the sleeve 71 and gear 31. Sleeve 71 is turned by gears 20, 21 at all times when the transmission is in operation.

For coupling the gears 31 and 22 together, there is located between them a toothed clutch mechanism of the synchronizing type which is operated by outside means and which has for its purpose to effect a union between these gears in a silent manner for driving the gear 31 by the gear 22.

The gear 22 is in constant mesh with the gear 18 on the shaft 12, and the elements of the synchronizing clutch that it embodies include a hub 77 which has a recessed end and is provided with axial splines 23 on its periphery. Slidably mounted on the splines 23 is a collar 24 which is of substantially the same axial length as the hub 77 and has a peripheral groove 25 cut in it. Fitted in the groove 25 is a shifter 26 which is capable of endwise motion under the influence of outside control means for shifting the collar 24 from its position as shown into another position indicated in dotted lines at 24a.

The elements pertaining to the synchronizing clutch mechanism on the gear 31 include a set of clutch teeth 30 close to the gear side, these teeth being of the same size and shape as the internal splines on the hub 24 whereby they can be engaged by the collar 24 when it assumes position 24a. Adjacent the teeth 30 the gear 31 is provided with a cone face 29 which extends over a portion of the gear bearing 39.

In loose contact with the cone face 29, when not under load, is a blocking and synchronizing ring 28 which is provided with an inner conical surface matching that of the cone 29 and is, moreover, provided with a set of blocking teeth 27 on a flange in close proximity to the clutch teeth 30 on the gear 31, the teeth 27 being identical in shape and size with the splines 23 on the hub 77 whereby they can be engaged by the collar 24. The blocking ring 28 projects with a part of its body into a recess in the hub 77, but normally is not in contact with said hub.

The blocker-synchronizer mechanism functions in the usual manner to couple the gears 31 and 22 together for power transmission when collar 24 is moved to the left, as viewed in Fig. 1, by means of the shifter 26, until its splines 23 slip over the teeth 30 on the gear 31 as position 24a is reached.

Also carried upon the intermediate shaft 41 is a one-way coupling of the overrunning type between the gear 31 and the sleeve 71 which allows this gear to be driven by said sleeve during forward drive when clutch sleeve 24 is disengaged, but breaks the connection between them when gear 31 is turned faster than the sleeve as when it is coupled to the gear 22 by the collar 24, since gear train 18, 22 gives a faster drive than gear train 20, 21.

The one-way coupling may be of any suitable variety, and its details form no part of my present invention; it is shown as contained in a recessed end of the gear 31 next to the wall of the gear case 17, and comprising essentially a hub 35 which has a splined engagement with the sleeve 71 and has a number of unsymmetrical cams 34 on its periphery, the gradually sloping flanks of which are substantially tangential to the hub 35 and extend in the direction opposite to that of its rotation. The gear 31 is provided with a cylindrical smooth inner raceway 32, and between this raceway and the tangential flanks on the hub 35 is interposed a number of rollers 33. Whenever the gear 31 is driving, the rollers 33 will be free, and no positive connection between the gear 31 and the sleeve 71 will exist. Whenever the sleeve 71, driven by the gear 21, becomes the driving member and the gear 31 is uncoupled from the gear 22 by the collar 24, the rollers will jam, thereby effecting a positive connection from the sleeve 71 to the gear 31 for power transmission.

*Final drive-shaft assembly*

The final drive shaft 65 is supported rotatably in parallel relationship to the driving shaft 12 and the intermediate shaft 41 in the end walls of the gear case 17 in bearings 63 and 64, and between these extremities carries means to control the action of two of the forward speeds as well as the reverse speed of the transmission.

Disposed on and rotatable with relation to the shaft 65 adjacent bearing 63 is an elongated splined hub 45 rotatable on sleeve bearing 78. A gear 61 is rotatably mounted on the other end of shaft 65 on a smooth bearing 79. The gear 61 is in constant mesh with intermediate shaft gear 21. A gear 43 is slidably mounted on splines 44 of hub 45. Lateral motion of the gear is effected by a shifter 72 working in a groove 73 around the hub of the gear. The gear 43 is movable between two operative positions, in the first of which positions, shown in full lines in Fig. 1, it is in engagement with intermediate shaft gear 31 and in the second of which positions, shown in broken lines at 43a, it engages a reverse idler gear 83 on a shaft 82.

The gear 61 and the sleeve 45 are selectively and alternatively securable to the shaft 65 by positive toothed clutch mechanism embodied between them and which may be of a conventional blocking-synchronizing type, as shown. The hub 61a of gear 61 and the opposed end of hub 45 are provided with clutch teeth 46 and 53, respectively. Adjacent their toothed hub portions, the gear 61 and the sleeve 45 have cone faces 60 and 49, respectively, the cone faces tapering toward each other.

Interposed between the cone ends of the gear 61 and the sleeve 45, secured to the shaft 65 by splines 62, and axially locked thereon by rings 67 and 68, is a hub 80 which is a part of the synchronizer mechanism for coupling either the gear 61 or the sleeve 45 to the shaft 65. The outer periphery of the hub 80 is splined axially, the splines 81 being of the same shape and size as the clutch teeth 46 and 53 on the sleeve 45 and the gear 61, respectively. Positioned on the hub 80 in slidable engagement with the splines 81 thereon is a collar 52 which is of approximately the same width as the hub 80, and which has a peripheral groove 51 in which is fitted a shifter 50 for moving the collar 52 axially in either direction from its central or neutral position on the hub 80, to selectively couple either the sleeve 45 or the gear 61 to the shaft 65, as will be apparent.

The shaft 65 has an outside splined end 65a beyond the bearing 63, and secured to it at that end is a universal joint 69 which connects to a shaft 70 for driving the vehicle or other load.

REVERSE GEAR SHAFT AND IDLER

Disposed in parallel relationship to the shafts 12, 41, and 65 in the gear case 17 is a shaft 82 which carries rotatably a reverse idler gear 83. This gear is slidable on the shaft 82 between two positions, one of which is shown in full lines and the other of which is shown in broken lines at 83a, and is relatively long so that when it is in the full-line position it can engage simultaneously both the gear 31 on shaft 41 and the gear 43 on shaft 65, when gear 43 is in position 43a. For sliding the idler 83 axially to disengage it from gears 43 and 31, it has a groove 84 at one end thereof and a shifter 85 fitted into this groove and connected with outside means for applying axial thrust to displace the idler into the disengaged position designated 83a, and also lock it in both of its extreme positions.

FUNCTIONAL DESCRIPTION OF THE TRANSMISSION

The three forward speeds and the two reverse speeds that this transmission affords can be obtained using the eight gears disclosed hereinabove by compounding them into a number of gear trains through the instrumentality of the shifters 26, 50, 72, and 85.

Transmission in low gear

The train of gears that produces the lowest speed ratio includes the gears 20, 21, 31, and 43 on their respective three shafts 12, 41, and 65. In order to set up this train, the gear 43 on the sleeve 45 has to be in engagement with the gear 31, as it normally would be, provided the transmission was not used in reverse gear previous to putting it into low gear. If it was previously in reverse, then the gear 43 has to be transferred by the shifter 72 from its reverse position 43a to the full-line position shown, and thereby meshed with the gear 31. It now remains only to couple the hub 45 bearing the gear 43 to the shaft 65 by sliding the collar 52 to the left, into position 52a, to make it engage the teeth 46 of the gear 43.

The power flow will then be from the gear 20 to the gear 21, and through it to sleeve 71 and to the hub 35 of the one-way coupling 33 etc. inside the gear 31. Hub 35 being the driving member, rollers 33 will jam and will propel gear 31 at the rotational speed of the sleeve 71. The gear 31 will drive the gear 43, the sleeve 45, the collar 52, the hub 80, and the shaft 65 for final power take-off.

In the low speed ratio, four of the gears in the transmission are active, while the remaining four, 18, 22, 61, and 83, are idling.

Transmission in second gear

For operating in a speed next to the lowest, or second speed, the gear train consists of the gears 20, 21, and 61, and the five remaining gears become idlers. To shift from low to second speed, therefore, it is necessary to perform only one shifting operation, viz., sliding the collar 52 into position 52b in engagement with the teeth 53 on the gear 61.

Transmission in high gear

The gear train for the third, or high-speed ratio, is made up of the gears 18, 22, 31, and 43, the last two gears being those previously employed in the low-speed gear train, and the gear 43 is coupled to the shaft 65 through the collar 52 in the same way.

In this gear train, the two gears 22 and 31 have to be joined rigidly for power transmission, which is accomplished by slipping the collar 24 to position 24a to engage the teeth 30 of the gear 31. In this position the one-way coupling rollers 33 are inoperative for conveying power, because the speed ratio of the gears 18 and 22 is higher than that of the gears 20 and 21, and consequently the gear 31 rotates faster than the sleeve 71 and the hub 35 thereon.

Transmission in reverse gear

Two different reverse gear ratios are available in the transmission hereinabove disclosed, the two gear trains providing them being identical with those for the low and the high forward speeds with the exception that the reverse idler gear 83 is included between the gears 31 and 43. To accomplish this, the gear 43 is shifted from its engagement with the gear 31 into position 43a by the shifter 72, and the reverse gear idler 83 is slid into engagement with both of the gears 31 and 43. If clutch 24 is then disengaged from teeth 30, the lower of the two reverse speeds is derived from a gear train comprising the gears 20, 21, 31, 83, and 43. The higher of the reverse speeds involves the gears 18, 22, 31, 83, and 43 and is obtainable by moving the collar 24 into engagement with the teeth 30 on the gear 31. The collar 52 is necessarily in engagement with the teeth 46 of the sleeve 45 in both instances.

EMBODIMENT OF FIGURES 3, 4, AND 5

The main clutch

In the modification of Figs. 3, 4, and 5, the main clutch is assembled on a face $61^2$ of a flywheel $2^2$ bolted to a flanged crankshaft $1^2$ of an engine, which is not otherwise illustrated. The clutch comprises a housing $8^2$ in which a clutch pressure plate $9^2$ is carried in such a manner that it is driven in the angular direction but is slidable axially. Upon this plate $9^2$ bear, inside the housing $8^2$, springs $62^2$ which urge the plate forcibly toward the flywheel $2^2$. Between the faces $61^2$ and $64^2$ of the flywheel $2^2$ and the pressure plate $9^2$, respectively, is included a driven plate $3^2$, with friction lining thereon, which is normally held in compression by the pressure plate $9^2$ against the flywheel face $61^2$.

The pressure plate $9^2$ can be withdrawn from engagement with the driven plate $3^2$ by a number of fingers $6^2$ pivotally movable about studs $10^2$ in the housing $8^2$ to back the place $9^2$ away from the driven plate $3^2$ by means of pins $5^2$ when the fingers $6^2$, provided with adjustable buttons $11^2$, are acted upon by a thrust bearing $12^2$ through the instrumentality of outside release means (not shown) in the well-known manner.

The clutch-driven plate $3^2$ is secured to a hub $13^2$ in splined engagement with a shaft $14^2$ which is the driving shaft of the transmission.

The flywheel $2^2$ and the clutch mechanism above described are enclosed in a clutch housing $17^2$ which is integral with a gear case section $18^2$ in which all the shafts and gears of the transmission are assembled. The clutch compartment is separated from the compartment containing the change-speed gearing by a partition $17a^2$.

EMBODIMENT OF FIGURES 3, 4, AND 5

Drive-shaft assembly

The drive shaft is supported rotatably in the fore and aft walls of the gear-case section $18^2$ in bearings $15^2$ and $16^2$, and between these bearings mounts two gears $19^2$ and $20^2$ spaced apart. Gear $20^2$ is secured to the shaft $14^2$ as by being integral with it, and the other gear $19^2$ is rotatably mounted on it on a bushing $4^2$.

A clutch of the conventional blocking-synchronizing type is interposed between the gears $19^2$ and $20^2$ to selectively couple the gear $19^2$ to the shaft $14^2$ for power drive in a silent manner. The elements of the synchronizer include a collar $21^2$ actuatable by a shifter $22^2$ from the neutral position shown in full lines in which the gear $19^2$ is free to another position shown in broken lines and designated $21a^2$ in which the gear $19^2$ is clutched to shaft $14^2$.

EMBODIMENT OF FIGURES 3, 4, AND 5

Intermediate shaft assembly

Located in parallel relationship to the drive shaft $14^2$, and immovably secured in the end walls of the gear case $18^2$ as by a key $31^2$, is an intermediate shaft or countershaft $30^2$ which serves as a journal for two bearings $32^2$ and $33^2$ disposed adjacent said end walls. On bearings $32^2$ and $33^2$ runs a sleeve $37^2$ spanning the whole distance between the end walls of the gear case $18^2$. The sleeve $37^2$ is integral with a gear $34^2$ which is located at one of its extremities over the bearing $33^2$. At the opposite extremity, over the bearing $32^2$, the sleeve $37^2$ mounts a cluster gear consisting of two gears $38^2$ and $39^2$, the gear $39^2$ being in constant mesh with the gear $19^2$ on the shaft $14^2$, while the gear $38^2$ is adjacent it on the side away from the gear $34^2$.

The cluster consisting of the gears $38^2$ and $39^2$ is mounted rotatably on the sleeve $37^2$ by means of bearings $35^2$ and $36^2$, and is hollow from its left end to a point between these bearings. In this hollow portion of the gear cluster $38^2$—$39^2$ is embodied a one-way coupling which consists of a hub $65^2$ secured to the sleeve $37^2$ by means of splines $41^2$, and having conventional cam and roller wedging means as $40^2$, $42^2$, the details of which may be conventional and need not be considered.

The one-way coupling functions as a conventional over-running clutch to allow the cluster gears $38^2$ and $39^2$ to be driven by the sleeve $37^2$, but to break the connection between these members as soon as the rotational speed of the sleeve, driven by the gear $34^2$, becomes less than the speed of the cluster gears $38^2$—$39^2$ driven by the gear $19^2$.

EMBODIMENT OF FIGURES 3, 4, AND 5

Final drive-shaft assembly

The final drive shaft $70^2$ is supported rotatably in parallel relationship to the driving shaft $14^2$ and the intermediate shaft $30^2$ in the end walls of the gear case in bearings $42^2$ and $44^2$, and between these bearings carries two gears $45^2$ and $47^2$ spaced apart, an externally splined sleeve $75^2$ slidably supporting the gear $45^2$ thereon and normally free to rotate on the shaft $70^2$, and a synchronizing clutch member $48^2$ for coupling either the gear $47^2$ or the sleeve $75^2$ to the shaft $70^2$.

The gear $47^2$ is in constant mesh with the gear $34^2$ on the intermediate shaft $30^2$, and is rotatably mounted on the shaft $70^2$ on a bushing $55^2$.

The splines $76^2$ on the sleeve $75^2$ extend lengthwise and allow the gear $45^2$ to move between two extreme positions, the lateral movement of the gear $45^2$ being effected by a shifter $46^2$ working in a groove $69^2$ around the central portion of the gear $45^2$. When the gear $45^2$ is in its extreme right position, shown in full lines in Fig. 3, it is in engagement with the gear $38^2$ on the intermediate shaft assembly.

Both the gear $47^2$ and the sleeve $75^2$ carry clutch teeth forming elements of the conventional synchronizing clutch mechanism embodied between them, gear $47^2$ carrying clutch teeth $54^2$ while sleeve $75^2$ has a similar set of clutch teeth $74^2$, respectively, cut in said flanges. Interposed between the cone ends $53^2$ and $71^2$, secured to the shaft $70^2$ by splines $66^2$, and axially locked thereon by rings $67^2$, is a hub $65^2$ which is a part of the synchronizing clutch mechanism for coupling either the gear $47^2$ or the sleeve $75^2$ to the shaft $70^2$. The outer periphery of the hub $65^2$ is splined axially, the splines $49^2$ having identical shape and size to the clutch teeth $74^2$ and $54^2$ on the sleeve $75^2$ and the gear $47^2$, respectively. Positioned on the hub $65^2$ in slidable engagement with the splines $49^2$ thereon is a collar $48^2$ which has a peripheral groove $68^2$ accommodating a shifter $55^2$ for moving the collar $48^2$ axially in either direction from its central or neutral position on the hub $65^2$.

The action of the synchronizing clutch mechanism just disclosed is analogous to those previously described, the collar $48^2$ being slidable to engage either the teeth $54^2$ or the teeth $74^2$ to couple either gear $47^2$ or sleeve $75^2$ to the output shaft.

The shaft $70^2$ projects outwardly through the bearing $42^2$ and is provided with a splined end $56^2$ on which is mounted a speedometer drive gear $58^2$ and a universal joint $57^2$ for driving a vehicle or other load through a shaft $60^2$.

EMBODIMENT OF FIGURES 3, 4, AND 5

Reverse gear shaft and idler

Disposed in parallel relationship with and at proper distance from the shafts $30^2$ and $70^2$ is a fourth shaft $80^2$ which is held in the end walls of the gear case $18^2$ in a boss $84^2$ at one end, and in a boss $83^2$ at the opposite end, and between these ends carries rotatably, on a bushing $79^2$, a reverse idler gear $78^2$. This idler gear has a groove $82^2$ at one of its ends in which a shifter $81^2$ is fitted for transferring the idler into either one of two positions. In the position shown in broken lines at $78a^2$, the idler $78^2$ is out of mesh with all other gears, and is placed in that position while the transmission is in any of the forward speeds. In the other position shown in full lines, the idler meshes with the gear $38^2$ on the shaft $30^2$, and with the gear $45^2$ on the sleeve $75^2$ for driving the output shaft. When the reverse idler is thus engaged, gear $45^2$ is shifted out of the position shown in full lines in Fig. 3 in mesh with the gear $38^2$, into the position shown in broken lines at $45a^2$ in Fig. 3 and shown in full lines in Fig. 5.

EMBODIMENT OF FIGURES 3, 4, AND 5

Functional description

The three forward speeds and the two reverse speeds that this transmission affords can be obtained with the eight gears disclosed hereinabove by compounding them into a number of gear trains through the instrumentality of the shifters $22^2$, $55^2$, and $46^2$.

The train of gears that produces the lowest forward speed ratio includes the gears $20^2$, $34^2$, $38^2$, and $45^2$ on their respective shafts $14^2$, $30^2$, and $70^2$. In order to set up this train, assuming the vehicle to be starting from a standing position, the gear $45^2$ must be in mesh with the gear $38^2$. By coupling the sleeve $75^2$ with the shaft $70^2$ through the synchronizing clutch mechanism, by sliding the collar $48^2$ to the left into position $48b^2$, a continuous and positive path for power transmission between the shafts $14^2$ and $70^2$ is established through the above-named gears. Gears $19^2$, $39^2$, $34^2$, $47^2$, and $78^2$ remain idle.

For operating in the second or next to the lowest forward speed drive, the gear train consists of the gears $20^2$, $34^2$, and $47^2$, and the five remaining gears become idlers. For this speed, therefore, it is necessary to perform only one shifting operation, viz., sliding the collar $48^2$ into position $48a^2$ in engagement with the teeth $54^2$ on the gear $47^2$.

The gear train for the third or high-speed ratio is made up of the gears $19^2$, $39^2$, $38^2$, and $45^2$. In order to set up this gear train, the collar $21^2$ on the shaft $14^2$ is shifted into position $21a^2$ to couple the gear $19^2$ to the shaft $14^2$, and on the shaft $70^2$ the collar $48^2$ is shifted into position $48b^2$ in mesh with the teeth $74^2$ of the sleeve $75^2$. The gear $45^2$ on this sleeve is normally in position $45a^2$ in engagement with the gear $38^2$.

The one-way coupling on the intermediate shaft $30^2$ is inoperative for conveying power because the speed ratio of the gears $19^2$ and $38^2$ is higher than that of the gears $20^2$ and $34^2$, and consequently the gear $38^2$ overruns the sleeve $37^2$.

Two different reverse-gear ratios are available in the transmission hereinabove disclosed, the two gear trains providing them being identical with those for the low and the high forward speeds as described in the preceding paragraphs, with the exception that the reverse idler gear $78^2$ is included between the gears $38^2$ and $45^2$. To accomplish this, the gear $45^2$ is shifted from its engagement with the gear $38^2$ into position $45^2$ by the shifter $46^2$, and the reverse idler gear $78^2$ is slid into engagement first with the gear $38^2$ and then with the gear $45^2$, so that its width covers both of them.

The lower of the two reverse speeds is then derived from a gear train comprising the gears $20^2$, $34^2$, $38^2$, $78^2$, and $45^2$. The higher of the reverse speeds involves the gears $19^2$, $39^2$, $38^2$, $78^2$, and $45^2$. Either one of these two reverse speeds is obtainable by means of the collar $21^2$, which in the disengaged position gives the lower of the two speed ratios, and when engaged with the teeth $28^2$ on the gear $19^2$, gives the higher ratio. The collar $48^2$ on the shaft $70^2$ is necessarily in position $48b^2$ in engagement with the teeth $74^2$ on the sleeve $75^2$ in both instances.

EMBODIMENT OF FIGURES 6, 7, AND 8

The clutch

In the further modification shown in Figs. 6, 7, and 8, the unitary clutch-transmission assembly is also adapted to be mounted on one end of an engine in the conventional manner, and to be coupled to it through a releasable main clutch of any well-known type, such as the one shown. The engine is only illustrated to the extent of its flanged crankshaft $1^3$ to which is bolted a flywheel $2^3$. Secured to the flywheel $2^3$ is a clutch housing $8^3$ containing a driving pressure plate $3^3$ which is axially slidable in the housing $8^3$, and is acted upon by a number of springs $9^3$ for engagement with a driven plate $4^3$, faced with friction lining, between the lateral face of the pressure plate $3^3$ and the face $76^3$ of the flywheel $2^3$.

The clutch housing $8^3$ pivotally supports a number of fingers $6^3$ which are fastened to the pressure plate $3^3$ by means of pins $32^3$ for releasing said plate from engagement with the plate $4^3$ by means of a central thrust collar $7^3$ which is movable by external means against the ends of the fingers $6^3$ in the well-known manner. The clutch-driven plate $4^3$ has a splined hub $5^3$ carried on a central shaft $12^3$ which is the main driving shaft of the transmission.

The clutch mechanism above described is enclosed in a bell-shaped housing $10^3$ which is adapted to be bolted to an engine around the flywheel $2^3$, and to extend over and around the aforementioned clutch to a gear case $11^3$ which contains all the gearing and shafting of the transmission.

EMBODIMENT OF FIGURES 6, 7, AND 8

Driving shaft assembly

The driving shaft $12^3$ is supported rotatably in two axially spaced bearings $13^3$ and $14^3$ located in the fore and aft walls of the gear case $11^3$. Two gears $15^3$ and $23^3$, on bushings $27^3$ and $30^3$, respectively, are mounted on the shaft $12$ adjacent the bearings $13^3$ and $14^3$, so that these gears are free to rotate on said shaft when they are not under load, i. e., when they are not coupled to it.

Both of the gears $15^3$ and $23^3$ are characterized by a set of clutch teeth $16^3$ and $22^3$ and a cone face $18^3$ and $21^3$, respectively, the clutch teeth and the cone faces being elements of a conventional synchronizing clutch mechanism which is interposed between the gears $15^3$ and $23^3$ for coupling either one of them to the shaft $12^3$ in a silent manner for power drive. Shiftable clutch collar $19^3$ is movable in either direction from the central or neutral position in which it is shown in full lines in Fig. 6. As the shifter $25^3$, actuated by the lever $87^3$ and the crank $95^3$, moves the collar $19^3$ toward either one of the gears $15^3$ or $23^3$, the detent ball $84^3$ will be forced out of the central groove $85^3$ and thereby will allow the collar $19^3$ to be displaced into either one of its end positions $19a^3$ or $19b^3$. This action enables the collar $19^3$ to be slipped into engagement with the clutch teeth $16^3$ or $29^3$ without clashing and establishes a coupled relationship of either the gear $15^3$ or gear $23^3$ with the shaft $12^3$.

EMBODIMENT OF FIGURES 6, 7, AND 8

Intermediate shaft assembly

The gears $15^3$ and $23^3$ are in a constant mesh with their mating gears $34^3$ and $33^3$, respectively, which latter two gears are both an integral part of a cluster $81^3$, as are two other gears $35^3$ and $36^3$ on the left side of the gear $34^3$. The whole gear cluster $81^3$ is supported rotatably on two oppositely tapered roller-bearing assemblies $37^3$ and $38^3$ which are carried on a nonrotatable intermediate shaft $31^3$. Shaft $31^3$ projects slidably through the forward wall of the gear case $11^3$ for support in parallel relationship to the shaft $12^3$, and at its other end is so supported in the opposite one of said walls as to permit taking up any clearance that may develop in the countershaft bearings $37^3$, $38^3$. This supporting and take-up means includes a head $131^3$ on the end of the shaft $31^3$ forming a shoulder $132^3$ bearing against the inner race or cone of the tapered bearing assembly $38^3$. It will also be noted that the cone $137^3$ of the other tapered bearing assembly bears against the gear case wall.

The head $131^3$ is supported in an opening $139^3$ formed in a supporting plate $140^3$ attached to the inner face of the gear case rear wall by cap screws $141^3$. A cover plate $145^3$ closes the outer end of opening $139^3$ and covers the shaft head $131^3$, being secured to supporting plate $140^3$ by cap screws $146^3$, and additional cap-screw means as $142^3$ extend through the cover plate into one or more tapped openings in the end of shaft $31^3$ to hold the shaft against endwise movement. Shim means as $144^3$ is interposed between the end of the shaft and the gear case wall. It will be seen that by changing the thickness of the shim means, the position of the shaft $31^3$ can be axially adjusted to simultaneously correct clearance that may develop in either or both of the bearings $37^3$, $38^3$.

EMBODIMENT OF FIGURES 6, 7, AND 8

*Final drive-shaft assembly*

A third shaft $50^3$, in parallel relationship to the shafts $12^3$ and $31^3$, constitutes the final drive shaft of the transmission for power take-off; it is carried rotatably in two bearings $59^3$ and $60^3$ in the end walls of the gear case $11^3$, and positioned on it next to the bearing $60^3$ is a gear $54^3$ which is in mesh with the gear $33^3$ of the cluster $81^3$. The gear $54^3$ is fitted with a bushing $57^3$ on the shaft $50^3$ for free rotation thereon when not under power.

Integral with the gear $54^3$ is a set of clutch teeth $58^3$ and a cone face $55^3$ adjacent thereto, these being elements of a synchronizing clutch mechanism analogous to that disclosed hereinabove on the shaft $12^3$.

Also carried rotatably on the shaft $50^3$, next to the bearing $59^3$ is a sleeve $43^3$ which runs on bushings $61^3$ and $62^3$ and which is characterized by a splined periphery $42^3$, the splines extending over its major portion from the bearing $59^3$ toward its opposite end whereat the sleeve $43^3$ is provided with a set of clutch teeth $44^3$ and a cone face $46^3$ adjacent thereto at the axial extremity. These teeth and cone face constitute the engaging means on the sleeve $43^3$ for the aforementioned synchronizing clutch.

On the splines $42^3$ of the sleeve $43^3$ is mounted slidably a gear $39^3$ which is movable lengthwise between three functional positions by a shifter $41^3$ engaging the gear in a groove $40^3$.

The mechanism for shifting the gear $39^3$ by means of the shifter $41^3$ is similar to that described in connection with the collar $19^3$ and includes a crank $94^3$ which holds, on a swivel, the shifter $41^3$. The crank $94^3$ is rocked angularly by a shaft $93^3$ in the wall of the gear case $11^3$ and by an outside lever $92^3$, the rocking motion of the crank being confined between three operational positions as established by three grooves $91^3$ in proper angular spacing on the arcuate perimeter of the crank $94^3$. A detent ball $91^3$, forcibly backed by a spring $89^3$, drops into the groove $91^3$ defining any one of the three positions of the shifter $41^3$ and the gear $39^3$ and yieldably holds them in that position until dislodged forcibly by the lever $92^3$ and transferred into another groove.

The collar $47^3$ of the synchronizing clutch has a peripheral groove $52^3$ for a shifter $53^3$ and is movable from its central or neutral position, sideways into either one of its extreme axial positions in mesh with either the teeth $44^3$ on the sleeve $43^3$, or the teeth $58^3$ on the gear $54^3$.

The mechanism for providing the shifter $53^3$ and the collar $47^3$ with their translatory movement and for locking them in their middle as well as extreme end positions is substantially the same as that described hereinabove in connection with the shifter $25^3$.

Located on and near the extremities of the shaft $50^3$ adjacent the bearings $59^3$ and $60^3$, respectively, and secured to said shaft by means of splines $67^3$ and $96^3$ are a universal joint $66^3$ and a speedometer drive gear $64^3$ respectively. The universal joint $66^3$ couples the shaft $50^3$ to a vehicle propelling shaft $71^3$; the speedometer drive gear meshes with a mating gear $65^3$ in a housing $63^3$ for a speedometer shaft take-off.

EMBODIMENT OF FIGURES 6, 7, AND 8

*The reverse gear shaft and idler*

Disposed in parallel relationship with and at proper distances from the shafts $31^3$ and $50^3$ is a fourth shaft $68^3$ which is pinned in the end wall of the gear case $11^3$ at one extremity, and supported in a boss $82^3$ at the other extremity and between these extremities carries rotatably, on a bushing $69^3$, a reverse idler gear $70^3$. Idler gear $70^3$ is in constant mesh with the gear $36^3$ of the cluster $81^3$ and is engageable with the gear $39^3$ on the sleeve $43^3$ by a sliding movement of the latter gear by means of the shifter $41^3$.

EMBODIMENT OF FIGURES 6, 7, AND 8

*Functional description of the transmission*

The various gears and shafts of this embodiment in their particular and novel relationship as disclosed hereinabove, can produce four different speed ratios in the forward direction of a vehicle and two in the reverse, these ratios being obtainable by operating the three shifters in such a manner as to establish certain combinations between the gears as disclosed.

The lowest forward speed ratio is obtained from neutral as follows: The shifter $41^3$ slides the gear $39^3$ from neutral towards the right into mesh with the gear $35^3$, the shifter $25^3$ moves the collar $19^3$ into mesh with the teeth $22^3$, thereby coupling the shaft $12^3$ to the gear $23^3$, which drives the cluster $81^3$ including the gear $35^3$. The latter gear, by virtue of being in mesh with the gear $39^3$ on the shaft $50^3$, drives the sleeve $43^3$ on the same shaft. In order to couple the sleeve $43^3$ to the shaft $50^3$ for final drive, the shifter $53^3$ is then moved into its extreme left position whereby the collar $47^3$ will engage the teeth $44^3$ and thereby transmit power from the sleeve $43^3$ into the shaft $50^3$. In this low speed the inactive gears $15^3$ and $54^3$ and the reverse idler gear $70^3$ spin on their respective shafts $12^3$, $50^3$, and $68^3$.

It may be observed that as many as three distinct shifting operations are required to put the transmission into gear for one particular ratio. Two of these, i. e., the shifting of the two synchronizing clutch collars 19³ and 47³, can be effected simultaneously, but for either this simultaneous shift, or for the shift of the gear 39³ into mesh with the gear 35³, a declutching operation of the clutch plate 4³ is a prerequisite in the same manner as in shifting the gears of conventional vehicle transmissions.

An intermediate second speed is obtained by retaining the gear 39³ and the collar 47³ in engagement with their mating members 35³ and 43³, respectively, and moving the collar 19³ by means of the shifter 25³ into engagement with the gear 15³ through the speed synchronizing procedure hereinabove described. The flow of power then will be through the shaft 12³ into the hub 74³, the collar 19³, the gears 15³, 34³, and 39³, the sleeve 43³, the collar 47³, the hub 72³, and the shaft 50³. This relationship will leave the gears 23³, 54³, and 70³ freely idling on their respective shafts 12³, 50³, and 68³.

Another intermediate or third speed is put into operation by leaving the collar 19³ in engagement with the gear 23³ as in the second speed, and shifting the collar 47³ into engagement with the gear 54³ through the synchronizing action of the mechanism hereinabove described. This operation releases the gear 39³ from positive engagement and allows it to idle with the sleeve 43³ on the shaft 50³, as does the gear 15³ on the shaft 12³ and the gear 70³ on the shaft 68³.

A high gear ratio which may give an overdrive effect is obtainable in the novel transmission of this description by retaining the collar 47³ in engagement with the gear 54³, and shifting the collar 19³ into engagement with the gear 15³. The active gears will then be the gears 15³, 34³, 33³, and 54³, while the gears 23³ and 39³, and of course the idler reverse gear 70³, will be relieved of all loads and will rotate freely on their respective shafts.

In order to reverse the rotation of the shaft 50³ in relation to that of the shaft 12³, the gear 39³ is moved into its extreme left-hand position next to the bearing 59³, which brings it into mesh with the reverse idler 70³, and the collar 47³ is engaged with the sleeve 43³ for establishing a path for the flow of power from the gears 36³, 70³, and 39³ into the shaft 50³. In this case, there are two ways in which the collar 19³ can be engaged, either with the gear 15³ or the gear 23³, each of which will result in a different driving speed on the shaft 50³. By engaging the collar 19³ with the gear 23³, the lower speed drive of the two will obtain, while engaging it with the gear 15³ will result in a somewhat higher speed, provided, of course, that the relative sizes of the gears to one another is substantially in the proportions shown.

It will be apparent that other variations and modifications may be introduced without departing from the fair and intended scope of the subjoined claims.

I claim:

1. In a power-drive assembly comprising a main clutch and a change speed gear transmission, a shaft drivable through the main clutch, a pair of driving gears of different sizes fast upon said drivable shaft, a countershaft, an output shaft, a driven gear carried by said output shaft, and means carried by the countershaft for transmitting a drive to said driven gear from either of said driving gears including a gear meshing with said driven gear and free upon the countershaft, a releasable clutch for establishing a positive two-way driving connection between said free countershaft gear and one of said driving gears, and an overrunning clutch providing a permanent one-way driving connection between said free countershaft gear and the other of the driving gears, whereby by selective engagement and disengagement of said releasable clutch said free gear may be driven either positively by one of the driving gears, or through said overrunning clutch by the other of said driving gears to impart drives of differing torque ratios to said output gear and output shaft.

2. In combination with means as set forth in claim 1, a second driven gear loosely mounted on said output shaft and meshing with one of said two first-mentioned countershaft gears, and a clutch for selectively clutching and releasing said second driven gear with respect to said output shaft.

3. Means as set forth in claim 2 in which both of said output gears are free upon the output shaft, said last-mentioned clutch comprising a positive toothed clutch element fast upon the output shaft and movable from a neutral position in which both of the driven gears are loose, to either of two clutching positions in which one or the other of said driven gears is clutched to said output shaft.

4. Means as set forth in claim 1 in which said releasable clutch comprises a positively toothed element slidably supported by the countershaft.

5. A power drive assembly as set forth in claim 1 wherein said means for transmitting a drive includes a pair of countershaft gears in constant mesh with the driving gears, interfitted shaft portions including one such shaft portion connected to each gear of said last-mentioned pair and projecting laterally therefrom, said releasable clutch being arranged to couple the outer of said shaft portions to said free countershaft gear, said overrunning clutch having one part connected to said free gear and the other part connected to the other of said interfitted shaft portions.

6. A power drive assembly as set forth in claim 1 wherein said means for transmitting a drive includes a pair of countershaft gears in constant mesh with the driving gears, interfitted shaft portions including one such shaft portion connected to each gear of said last-mentioned pair and projecting laterally therefrom, said releasable clutch being arranged to couple the outer of said shaft portions to said free countershaft gear, said overrunning clutch having one part connected to said free gear and the other part connected to the other of said interfitted shaft portions, said overrunning clutch being housed within the free gear and the inner one of said interfitted shafts extending into such overrunning clutch to support the inner member of the overrunning clutch.

7. A power drive assembly as set forth in claim 1 wherein said means for transmitting a drive includes a pair of countershaft gears in constant mesh with the driving gears, one gear of said last-mentioned pair being also connected to said overrunning clutch and the other gear of said last-mentioned pair being also connected to said releasable clutch.

8. A power drive assembly as set forth in claim 1 wherein said means for transmitting a drive includes a pair of countershaft gears in constant mesh with the driving gears, one gear of said last-mentioned pair being also connected to said overrunning clutch and the other gear of said last-mentioned pair being also connected to said releasable clutch, a second driven gear carried by the output shaft and meshing with one gear of said pair of countershaft gears, and a clutch for connecting and releasing said last-mentioned gear with respect to the output shaft.

9. A power drive assembly as set forth in claim 1 wherein said means for transmitting a drive includes a pair of countershaft gears in constant mesh with the driving gears, one gear of said last-mentioned pair being also connected to said overrunning clutch and the other gear of said last-mentioned pair being also connected to said releasable clutch, a second driven gear carried by the output shaft and meshing with one gear of said pair of countershaft gears, and a clutch element keyed to the output shaft and movable to couple and release either of said driven gears with respect to the output shaft.

10. A power drive assembly as set forth in claim 1 wherein said means for transmitting a drive includes a pair of countershaft gears in constant mesh with the driving gears, one gear of said last-mentioned pair being also connected to said overrunning clutch and the other gear of said last-mentioned pair being also connected to said releasable clutch, a second driven gear carried by the output shaft and meshing with one gear of said pair of countershaft gears, a reverse idler, one of said driven gears also being movable out of mesh with the countershaft gear with which it is engageable, and into mesh with said reverse idler.

11. A power drive assembly comprising a main clutch and a change speed gear transmission, a casing having separate compartments, one compartment enclosing said clutch and another compartment enclosing said transmission, a transmission driving shaft connected to the output of said clutch and located within said transmission compartment, a countershaft and a transmission output shaft also housed in the transmission compartment, all of such shafts being disposed in parallel relation, torque converting gearing arranged in a plurality of trains of varying ratios and carried by said shafts, including a pair of gears carried by the driving shaft, at least two gears carried by the output shaft, at least three gears carried by the countershaft for providing driving connections of different ratios between the driving shaft gears and the output shaft gears, means including positive clutch elements for rendering the drive through at least one of the gear trains effective and ineffective, and means including an over-running clutch and a positive two-way driving clutch for driving one of said countershaft gears from either of the two gears carried by said driving shaft.

12. Means as set forth in claim 11 in which said overrunning clutch is mounted on the countershaft and said positive two-way driving clutch is mounted on said driving shaft.

13. Means as set forth in claim 11 in which both the overrunning clutch and said positive two-way driving clutch are mounted on said countershaft.

14. In a transmission construction having an input shaft, a countershaft and an output shaft, a first gear train for connecting the input and output shafts, a second gear train for connecting the input and output shafts, said trains including a countershaft gear, a pair of output gears loose on the output shaft, one output gear being incorporated in each of said trains, the output gear in one of said trains being slidable into and out of mesh with one of said countershaft gears, a sleeve between said slidable output gear and the output shaft, the slidable output gear being keyed to the sleeve and the sleeve being loose on the shaft, and synchronizing-type clutching mechanism also carried by the output shaft for selectively clutching to said shaft either the sleeve or the other output gear.

15. Means as defined in claim 14 including an overrunning clutch incorporated in said one of said countershaft gears.

16. Means as defined in claim 14 including an overrunning clutch incorporated in said one of said countershaft gears, and a reverse idler with which said slidable gear is also engageable.

17. Means as defined in claim 14 including an overrunning clutch incorporated in said one of said countershaft gears, and a slidable reverse idler movable to and from a position of meshing engagement with both said slidable gear and said last-mentioned countershaft gear when the slidable gear is out of mesh with said last-mentioned countershaft gear.

18. Means as set forth in claim 14 wherein said second train includes two countershaft gears rotatable as a unit, and with one of which countershaft gears said slidable output gear is adapted to mesh.

19. Means as set forth in claim 14 including an overrunning clutch in the second train.

20. Means as set forth in claim 14 including an overrunning clutch incorporated in a countershaft gear forming a part of the second train.

21. A power drive assembly as set forth in claim 1 wherein said means for transmitting a drive includes a pair of countershaft gears in constant mesh with the driving gears, one gear of said last-mentioned pair being also connected to said overrunning clutch and the other gear of said last-mentioned pair being also connected to said releasable clutch, a reverse idler, said driven gear also being movable out of mesh with the countershaft gear with which it is engageable, and into mesh with said reverse idler.

ROSCOE C. HOFFMAN.

REFERENCES CITED

The following references are of record in the file of this patent:

UNITED STATES PATENTS

| Number | Name | Date |
|---|---|---|
| 1,983,955 | Von Soden | Dec. 11, 1934 |
| 2,149,009 | Chievitz | Feb. 28, 1939 |
| 2,300,502 | Haltenberger | Nov. 3, 1942 |
| 2,320,757 | Sinclair et al. | June 1, 1943 |
| 2,320,960 | Wheaton | June 1, 1943 |
| 2,356,506 | Clausen | Aug. 22, 1944 |
| 2,391,783 | Jacobi | Dec. 25, 1945 |
| 2,431,727 | Bennett | Dec. 2, 1947 |
| 2,465,832 | Banker | Mar. 29, 1949 |

FOREIGN PATENTS

| Number | Country | Date |
|---|---|---|
| 346,166 | Great Britain | Apr. 9, 1931 |
| 441,141 | Great Britain | Jan. 14, 1936 |
| 799,949 | France | Apr. 20, 1936 |